Nov. 14, 1944.  C. W. TINGLEY ET AL  2,362,949
V-BELT FASTENER
Filed Feb. 5, 1943
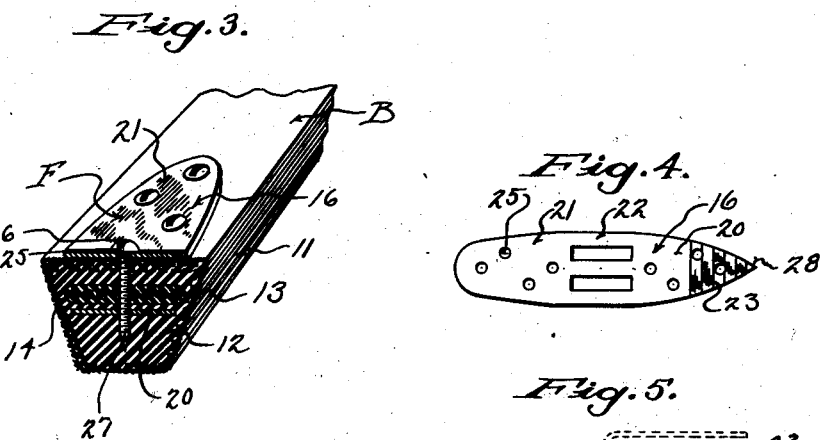
INVENTORS
WILLIAM P. REILLY
and CHARLES W. TINGLEY
BY
ATTORNEYS Patented Nov. 14, 1944

2,362,949

UNITED STATES PATENT OFFICE 2,362,949

V-BELT FASTENER

Charles W. Tingley, Milwaukee, and William P. Reilly, Menomonie Falls, Wis.

Application February 5, 1943, Serial No. 474,824

2 Claims. (Cl. 24—33)

This invention appertains to drive belts and more particularly to a novel fastener particularly adapted for connecting the ends of V-belts.

Much difficulty has been experienced in connecting the ends of V-belts and to our knowledge only one fastener for this purpose has appeared on the market. This fastener has met with some success, but is open to many serious objections. First, the fastener is difficult to apply to the belt and a complete set of special tool equipment is needed. This renders installation difficult and on some types of machines, dismantling of the machines is necessary. Second, the fastener is of a highly complicated order and embodies many parts and assembling of the parts and the installation of the fastener on the belt is a tedious operation and requires the employment of a specially trained operator. Third, the initial cost of the fastener and the special equipment is extremely high. Fourth, after installation the belts do not ride satisfactorily around the pulleys, in view of the fact that the bottoms of the belts have exposed metal parts. Fifth, the fasteners are not recommended for the repairing of endless cord V-belts and consequently there are many sets of such belts remaining useless and idle in the shops.

It is therefore one of the primary objects of our invention to provide a belt fastener of a simple and compact nature, which embodies a minimum number of parts and which can be quickly applied to the belt by an ordinary workman without the use of any special tools.

Another salient object of our invention is to provide a belt which can be effectively used for repairing endless cord V-belts, as well as belts having a woven fabric core, whereby such cord reenforced belts can be readily matched, repaired and again effectively used in multiple sets.

A further object of our invention is to provide a belt fastener, so constructed that the belt ends will be connected in such a manner that the bottom and sides of the belt will be smooth and unbroken and free from all obstructions, so that the belt will effectively ride on different characters of pulleys, such as V or flat pulleys without chatter.

A further important object of our invention is the provision of a belt fastener, in which the companion parts can be economically struck out from blanks of sheet metal and folded into proper form and quickly connected to the belt ends for interconnection with one another by a single rocker pin.

A still further important object of our invention is the provision of a belt fastener embodying companion parts, with each of said parts including leaves resiliently connected by hinge barrels, with one of the leaves so shaped that the same can be easily inserted in the belt below the reenforcing therein, with pointed self-tapping screws for insertion in the belt body between the reenforcement thereof for bringing the leaves into firm gripping contact with the belt material.

A still further important object of our invention is to provide a belt fastener of the above character, in which the belt material will be compressed by the fastener so that the thickness of the belt will not be increased or the contour thereof changed.

A still further object of our invention is the provision of means for forming the hinge barrels on the companion parts of the fastener whereby the hinge connection will be in close proximity to the center of the belt.

With these and other objects in view, the invention consists in the novel construction, arrangement and formation of parts, which will be hereinafter more specifically described, claimed and illustrated in the accompanying drawing, in which drawing:

Figure 1 is a longitudinal sectional view through the meeting ends of a V-belt showing our improved fastener applied thereto, the section being taken substantially on the line 1—1 of Figure 2 looking in the direction of the arrows.

Figure 2 is a fragmentary top plan view of the meeting ends of a V-belt showing our fastener applied thereto.

Figure 3 is a fragmentary sectional perspective view, the section being taken substantially on the line 3—3 of Figure 1 looking in the direction of the arrows.

Figure 4 is a top plan view of one section or part of the fastener, showing such part prior to being folded into shape.

Figure 5 is a side elevational view of the section or part shown in Figure 4, the view also showing in dotted lines the position of the leaves of the sectional part after being folded into form for use.

Figure 6 is a top plan view of the other section or part of the fastener, the view being similar to Figure 4.

Figure 7 is a side elevational view of the part or section shown in Figure 6.

Figure 8 is a fragmentary longitudinal sectional view showing a slightly modified form of the invention.

Figure 9 is a detail fragmentary plan view illustrating a further modified form of the inner leaf of one of the companion sections of the fastener.

Referring to the drawing in detail, wherein similar reference characters designate corresponding parts throughout the several views, the letter F generally indicates our novel fastener for a belt B. For the purpose of illustration the belt B is shown of the V type reenforced by longitudinal cords, but it is to be understood that the fastener can be used on various types of belts and can be effectively employed for connecting all characters and cross sectional sizes of V-belts. As shown, the belt B includes companion ends 10 and 11 which are adapted to be connected by our fastener F. The belt itself includes a rubber body 12 protected by a fabric casing 13 and reenforced by a plurality of longitudinally extending cords 14.

Our fastener F includes companion sections or parts 15 and 16 which are adapted to be secured respectively to the belt ends 10 and 11. The section or part 15 includes inner and outer leaves 17 and 18 integrally connected together by a slotted hinge barrel 19. The companion section or part 16 includes inner and outer leaves 20 and 21 integrally connected by a slotted hinge barrel 22. These sections or parts can be readily stamped flat from blanks of sheet metal and these stamped parts or sections are clearly shown in Figures 4 to 7. After the parts or sections are stamped out the same can be folded into a U shape so that the outer leaves will overlie the inner leaves. The inner faces of the leaves 17 and 20 of the sections 15 and 16 can be provided with transversely extending teeth or serrations 23 for gripping engagement with the belt, and if preferred the inner faces of the leaves 18 and 21 of the fastener sections or parts can be provided with similar teeth or serrations. The hinge barrels 19 and 22 are so formed that the barrels will inter-fit for the reception of a hinge or rocker pin 24. This hinge or rocker pin 24 can be formed from raw hide suitably impregnated with a lubricant, but obviously metal hinge or rocker pins can be provided. The leaves of the sections or parts are provided with openings 25 for the reception of self-tapping metal screws 26 and the screws and openings are arranged in a certain manner as will be later set forth. It is to be noted, however, that the inner ends of the screws are pointed as at 27. It is to be also noted that the inner ends of the inner leaves of the sections are provided with penetrating points 28.

In applying the sections or parts of the fastener to the belt ends it is merely necessary to take a sharp instrument, such as a pen knife, and slit the belt ends inwardly directly below the reenforcing cords 14 leaving the casing 13 intact. The inner leaves of the sections or fastener parts are now forced into the slits with the outer leaves riding on the outer faces of the belt ends. The pointed terminals of the inner leaves facilitate the forcing of the inner leaves into the belt. After the insertion of the leaves into proper position on the belt ends, the pointed self-tapping screws 26 are now threaded into the openings 25 and into the belt a considerable distance below the inner leaves as is clearly shown in Figure 3. As the screws are forced into place by the use of an ordinary screw driver, the same will effectively cut their own threads in lower leaf and the openings 25 are so shaped as to allow the screws to extend into the belt material between adjacent cords 14, so as to prevent the cutting of these cords and this is facilitated by the pointed terminals 27. The points of the screws also enter into the rubber below the lower leaf and hence the screws not only function to draw the leaves toward one another but also act to draw the rubber up below the lower leaf against and around the lower leaf. After the sections or the parts 15 and 16 have been connected to the belt ends, the hinge barrels 19 and 22 are interconnected and the hinge or rocker pin 24 is placed in position. The ends of the belt are now effectively connected.

Due to the simplicity of the fastener, the same can be easily applied to the belt ends without the dismantling of a machine and the same can be used for effectively connecting broken ends of endless cord V-belts and the belts can be readily matched for use in multiple sets. Particular attention is called to the fact that the bottom and sides of the belt are free from all obstructions and hence not only will the belts ride over the pulleys without chatter, but the belts can be used on smooth flat faced pulleys, which is often done.

In order to bring the hinge or rocker pin 24 adjacent the horizontal center of the belt, the hinge barrels can be offset inwardly as shown at 29 in Figure 8 of the drawing. This will eliminate the formation of an objectionable arch as the belt rides over a small pulley.

Much stress is laid on the fact that the screws are threaded into place and thus the companion leaves of the sections or parts are brought toward one another into tight gripping contact with the belt material and hence this material will be compressed and will be firmly held by the fastener. As the belt material is compressed, the size or configuration of the belt is not changed by the insertion of the inner leaves in the belt ends. Another important feature is that the fastener is located on the outer or extension area of the belt and is not located on the inner or compression area of the belt and in fact the inner leaves are positioned substantially at the neutral axis of the belt and between the compression and extension areas.

If it is desired, the inner leaf of the sections can be made relatively narrow and the opposite sides of the narrow portion can be provided with lateral projections 30. These projections are provided with openings for the screws. By making the leaf narrow, the leaf can be readily squeezed into a belt material without deforming the belt and the belt material will engage around and over the lateral projections to facilitate the resisting of any longitudinal pull on the sections of the fastener. It is to be also noted that the leading edges of the projections 30 are tapered or inclined as at 31, so as to facilitate the insertion of the leaf into the belt.

It is important that the lower leaf be formed from a minimum amount of material so as to eliminate the insertion of a bulky member into the belt end and to so form the inner leaf that the belt material will engage about the inner leaf. This can be accomplished in different ways other than by providing the narrow leaf with lateral projections. Thus the inner leaf can be provided with slots or openings into which the belt material can be forced.

While it is preferred to make the fastener sections from metal, the same can be made from materials which are not essential to the war effort and thus the sections can be made from a suitable plastic.

It is again desired to stress the importance of the screws, for, as stated, the screws not only function to draw the leaves together, of the sections, but to also draw the material below the inner leaf up into engagement with the inner leaf. The preferred type of screw would be one having an elongated thin body and a large thread, but it is to be understood that other screws, such as wood screws, can be used without departing from the spirit or the scope of our invention.

Changes in details may be made without departing from the spirit or the scope of the invention, but what we claim as new is:

1. The combination with an end of a V-belt of the type having a wide outer face and a narrow inner face and a longitudinally extending reinforcement therein adjacent to said outer face and parallel therewith, of a section of a belt fastener for connection with said end of the belt including a U-shaped member having inner and outer leaves and a connecting hinge barrel, said belt end having a slit therein between said reinforcement and the narrow inner face of the belt, said slit being parallel with the reinforcement and disposed between the side faces of the belt and spaced therefrom, said inner leaf of the U-shaped member being disposed in said slit and the outer leaf being disposed in intimate contact with the outer face of the belt and said hinge barrel projecting beyond the belt end, and screws extending through the outer leaf and into the belt material and through the reinforcement and the inner leaf for drawing the inner leaf toward the outer leaf for compressing and clamping the belt material between said inner and outer leaves.

2. The combination with an end of a V-belt of the type having a wide outer face and a narrow inner face and a longitudinally extending reinforcement therein adjacent to said outer face and parallel therewith, of a section of a belt fastener for connection with said end of the belt including a U-shaped member having inner and outer leaves and a connecting hinge barrel, said belt end having a slit therein between said reinforcement and the narrow inner face of the belt, said slit being parallel with the reinforcement and disposed between the side faces of the belt and spaced therefrom, said inner leaf of the U-shaped member being disposed in said slit and the outer leaf being disposed in intimate contact with the outer face of the belt and said hinge barrel projecting beyond the belt end, and screws extending through the outer leaf and into the belt material and through the reinforcement and the inner leaf for drawing the inner leaf toward the outer leaf for compressing and clamping the belt material between said inner and outer leaves, said inner leaf having a leading penetrating terminal for facilitating the insertion thereof in the slit.

CHARLES W. TINGLEY.
WILLIAM P. REILLY.